(12) United States Patent
Hagiwara (10) Patent No.: US 9,305,717 B2
(45) Date of Patent: Apr. 5, 2016

(54) ELECTROCHEMICAL DEVICE HAVING ELECTRIC STORAGE ELEMENT AND ELECTROYE SEALED IN INSULATING CASE

(71) Applicant: TAIYO YUDEN CO., LTD., Taito-ku, Tokyo (JP)

(72) Inventor: Naoto Hagiwara, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 156 days.

(21) Appl. No.: 14/196,822

(22) Filed: Mar. 4, 2014

(65) Prior Publication Data

US 2014/0368971 A1    Dec. 18, 2014

(30) Foreign Application Priority Data

Jun. 14, 2013  (JP) .................................. 2013-125145

(51) Int. Cl.
| | |
|---|---|
| *H01G 11/20* | (2013.01) |
| *H01G 11/74* | (2013.01) |
| *H01G 11/82* | (2013.01) |

(52) U.S. Cl.
CPC .............. *H01G 11/20* (2013.01); *H01G 11/74* (2013.01); *H01G 11/82* (2013.01); *Y02E 60/13* (2013.01)

(58) Field of Classification Search
CPC ........ H01G 11/20; H01G 11/74; H01G 11/82
See application file for complete search history.

(56) References Cited

U.S. PATENT DOCUMENTS

| | | | | |
|---|---|---|---|---|
| 8,563,166 B2 * | 10/2013 | Onodera | ................ | H01G 9/016 361/502 |
| 2007/0253141 A1 * | 11/2007 | Kato | ...................... | H01G 9/016 361/301.3 |
| 2007/0274024 A1 * | 11/2007 | Nemoto | ................. | H01G 9/016 361/502 |
| 2012/0125674 A1 * | 5/2012 | Miyahara | ................. | H01G 2/06 174/260 |
| 2013/0294012 A1 * | 11/2013 | Mano | ..................... | H01G 9/145 361/517 |

FOREIGN PATENT DOCUMENTS

| | | |
|---|---|---|
| JP | 2002198454 A | 7/2002 |
| JP | 2005093833 A | 4/2005 |
| JP | 2006-128089 A | 5/2006 |
| JP | 2007207920 A | 8/2007 |
| JP | 4773133 B2 | 9/2011 |

OTHER PUBLICATIONS

A Notification of Reasons for Refusal issued by the Japanese Patent Office, mailed Jan. 23, 2015, for Japanese counterpart application No. 2013-125145.

* cited by examiner

*Primary Examiner* — David M Sinclair
(74) *Attorney, Agent, or Firm* — Law Office of Katsuhiro Arai (57) ABSTRACT

An electrochemical device has a lid, case, electric storage element, electrolyte, and conductive bonding material layer. The case has a via hole and forms a solution chamber between itself and the lid. The electric storage element is accommodated in the solution chamber. The electrolyte is accommodated in the solution chamber. The wiring has a via hole part provided in the via hole and connects the interior and exterior of the solution chamber. The conductive bonding material layer fixes the electric storage element onto the case while electrically connecting the electric storage element and via hole part, where the conductive bonding material layer has a contact area that contacts the case and non-contact area that does not contact the case and the non-contact area is formed in a manner surrounding the via hole.

9 Claims, 4 Drawing Sheets

ELECTROCHEMICAL DEVICE HAVING ELECTRIC STORAGE ELEMENT AND ELECTROYE SEALED IN INSULATING CASE

FIELD OF THE INVENTION

The present invention relates to an electrochemical device having a chargeable/dischargeable electric storage element.

DESCRIPTION OF THE RELATED ART

Electrochemical devices having a chargeable/dischargeable electric storage element are widely used in backup power supplies, etc. These electrochemical devices are generally constructed as an insulating case in which an electric storage element and electrolyte are sealed. The insulating case is wired to electrically connect the sealed electric storage element and the exterior of the case. Here, these electrochemical devices require that the electrolyte be prevented from contacting the wiring. Should the electrolyte contact the wiring, the wiring may corrode (electrolytic corrosion) due to the voltage applied.

For example, Patent Literature 1 discloses an electric double-layer capacitor constituted by a positive electrode collector (wiring connecting the interior and exterior of the solution chamber) with a protective layer of conductive bonding material formed on top. This electric double-layer capacitor is constituted in such a way that the protective layer prevents the electrolyte from contacting the positive electrode collector and thereby prevents the positive electrode collector from corroding. Additionally, Patent Literature 2 discloses an electric double-layer capacitor constituted by a second metalized layer (wiring connecting the interior and exterior of the solution chamber) which is covered with a resin layer containing conductive grains. This electric double-layer capacitor is also constituted in such a way that the resin layer prevents the electrolyte from contacting the second metalized layer and thereby prevents the second metalized layer from corroding.

BACKGROUND ART LITERATURES

[Patent Literature 1] Japanese Patent No. 4773133
[Patent Literature 2] Japanese Patent Laid-open No. 2006-128089

SUMMARY

However, even the configurations described in Patent Literature 1 and Patent Literature 2, where the wiring is covered with a protective layer to prevent the electrolyte from contacting the wiring, have difficulty preventing such contact completely. Although the protective layer is formed on the case to cover the wiring, the electrolyte may still enter the interface between the protective layer and case and contact the wiring. Particularly when the electrochemical capacitor changes temperature as it charges/discharges, the difference between the thermal expansion coefficient of the case and that of the protective layer may cause the protective layer to separate from the case, in which event the electrolyte may contact the wiring.

In light of the aforementioned situation, an object of the present invention is to provide an electrochemical device capable of effectively preventing electrolyte contact with the wiring.

To achieve the aforementioned object, the electrochemical device pertaining to an embodiment of the present invention has a lid, case, electric storage element, electrolyte, and conductive bonding material layer.

The case has a via hole and forms a solution chamber between itself and the lid.

The electric storage element is accommodated in the solution chamber.

The electrolyte is accommodated in the solution chamber.

The wiring has a via hole part provided in the via hole and connects the interior and exterior of the solution chamber.

The conductive bonding material layer fixes the electric storage element onto the case while electrically connecting the electric storage element and via hole part, where the conductive bonding material layer has a contact area that contacts the case and non-contact area that does not contact the case, and the non-contact area is formed in a manner surrounding the via hole.

Any discussion of problems and solutions involved in the related art has been included in this disclosure solely for the purposes of providing a context for the present invention, and should not be taken as an admission that any or all of the discussion were known at the time the invention was made.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

DESCRIPTION OF THE SYMBOLS

100—Electrochemical device
11—Case
11e—Groove
12—Lid
13—Electric storage element
14—Positive electrode wiring
15—Positive electrode bonding layer
15a—Contact area
15b—Non-contact area
16—Positive electrode terminal
17—Negative electrode bonding layer
18—Seal ring
19—Negative electrode wiring
20—Negative electrode terminal
21—Gas release part

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

DETAILED DESCRIPTION OF EMBODIMENTS

The electrochemical device pertaining to an embodiment of the present invention has a lid, case, electric storage element, electrolyte, and conductive bonding material layer.

The case has a via hole and forms a solution chamber between itself and the lid.

The electric storage element is accommodated in the solution chamber.

The electrolyte is accommodated in the solution chamber.

The wiring has a via hole part provided in the via hole and connects the interior and exterior of the solution chamber.

The conductive bonding material layer fixes the electric storage element onto the case while electrically connecting the electric storage element and via hole part, where the conductive bonding material layer has a contact area that contacts the case and non-contact area that does not contact the case, and the non-contact area is formed in a manner surrounding the via hole.

According to this configuration, the electrolyte, if it enters the interface between the conductive bonding material layer and case, will enter the interface along the contact area from the outer periphery side of the non-contact area. Here, because the non-contact area is provided in a manner surrounding the via hole and the interface between the conductive bonding material layer and case is broken by the non-contact area, the electrolyte will not enter the contact area on the inner periphery side from the non-contact area, thereby preventing the electrolyte from reaching the via hole part.

The case may have a groove formed in a manner surrounding the via hole, while the non-contact area may be formed by the groove.

According to this configuration, the groove formed on the case separates the conductive bonding material layer and case, thus effectively forming the non-contact area on the conductive bonding material layer.

The groove is empty and gas may be sealed in the groove by the case and non-contact area.

According to this configuration, the electrolyte, even if it enters the interface between the conductive bonding material layer and case, will not enter the inner periphery side from the non-contact area because the interface is broken by the non-contact area, and entry of electrolyte is suppressed by the three-layer interface comprising the conductive bonding material layer, case, and gas. This is because the electrolyte tends to shrink due to surface tension.

The groove may accommodate a gas release part electrically connected to the conductive bonding material layer and made of a material that releases gas as a result of electrolytic corrosion upon contacting the electrolyte when the electrochemical device is charging.

According to this configuration, the electrolyte, even if it enters the interface between the conductive bonding material layer and case, will not enter the inner periphery side from the non-contact area because, as the electrolyte contacts the gas release part when the electrochemical device is charging, the gas release part releases gas as a result of electrolytic corrosion and the pressure of this gas causes the electrolyte to be pushed back.

The electrochemical device can have a configuration wherein the via hole part may be metal-plated and the gas release part has the same layer structure as that of the via hole part and metal plating.

According to this configuration, the gas release part can be formed simultaneously in the process of producing via hole part and metal plating, thus allowing for efficient manufacturing of the electrochemical device.

The groove may have a rectangular cross-section.

According to this configuration, the non-contact area can be formed on the conductive bonding material layer in the form of a groove.

The groove may have a V-shaped cross-section.

According to this configuration, the non-contact area can be formed on the conductive bonding material layer in the form of a groove.

The groove may have side faces and a bottom face, and the side faces may form sharp angles with the bottom face.

According to this configuration, the non-contact area can be formed on the conductive bonding material layer in the form of a groove.

The groove may have an L-shaped cross-section.

According to this configuration, the non-contact area can be formed on the conductive bonding material layer in the form of a groove.

The disclosed embodiments will be explained with respect to the drawings. However, the present invention is not limited to the disclosed embodiments.

(First Embodiment)

The electrochemical device pertaining to the first embodiment of the present invention is explained.

[Overall Configuration of Electrochemical Device]

Figure 1:
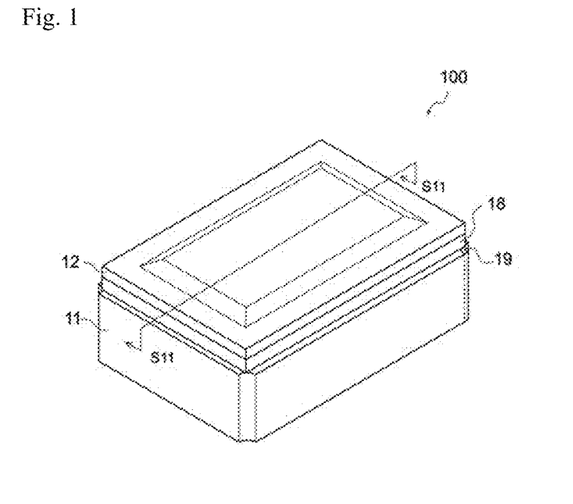
FIG. 1 is a perspective view of an electrochemical device pertaining to an embodiment of the present invention.
Figure 2:
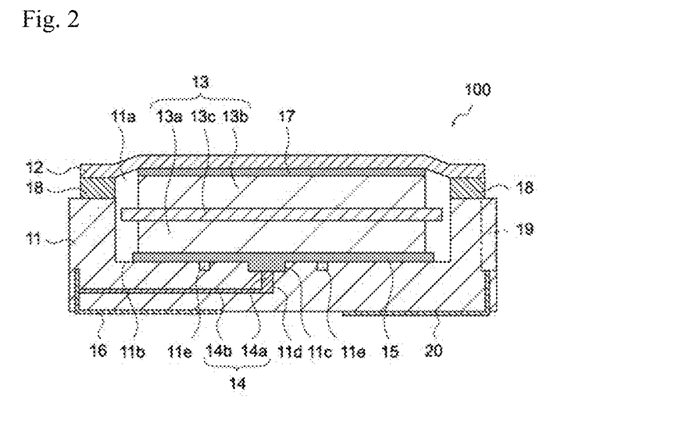
FIG. 2 is a cross sectional view of the electrochemical device, taken along line S11-S11 indicated in FIG. 1.
Figure 3:
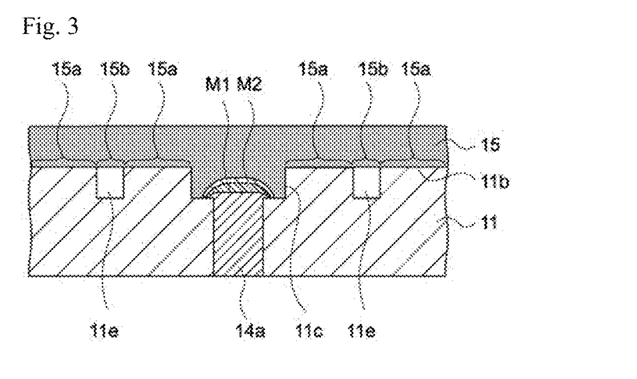
FIG. 3 is an enlarged section view of the electrochemical device.

FIG. 1 is a perspective view showing the appearance of an electrochemical device 100 pertaining to this embodiment. FIG. 2 is a section view of the electrochemical device 100, cut along line S11-S11 (FIG. 1). FIG. 3 is an enlarged view of a part of the section view in FIG. 2. As shown in these figures, the electrochemical device 100 has a case 11, lid 12, electric storage element 13, positive electrode wiring 14, positive electrode bonding layer 15, positive electrode terminal 16, negative electrode bonding layer 17, seal ring 18, negative electrode wiring 19, and negative electrode terminal 20.

As shown in FIG. 2, the electrochemical device 100 is constituted in such a way that the case 11 and lid 12 are joined via the seal ring 18 and the electric storage element 13 and electrolyte are sealed in a solution chamber 11a formed by them.

The case 11 is made of insulating material and forms the solution chamber 11a with the lid 12. The case 11 may be formed as a concave shape to constitute the solution chamber 11a, where it can have a rectangular solid shape as shown in FIG. 1, or columnar or any other shape. The surface corresponding to the bottom face of the solution chamber 11a of the case 11 is hereinafter referred to as the "bottom face 11b." Formed on the bottom face 11b is a concave part 11c shaped as a depression in the bottom face 11b, and a via hole 11d is formed in the concave part 11c. As shown in FIG. 2, the via hole 11d may be formed in a manner continuing midway through the case 11, or penetrating to the back side of the case 11. In addition, a groove 11e is formed in the bottom face 11b around the via hole 11d. This groove 11e will be described later.

The case 11 may be made of HTCC (high temperature co-fired ceramics) or LTCC (low temperature co-fired ceramics), although its material is not limited in any way. The HTCC process and LTCC process offer excellent manufacturing efficiency because the positive electrode wiring 14, etc., can be placed in the case 11.

The lid 12 is joined to the case 11 via the seal ring 18 and seals the solution chamber 11a. The lid 12 may be made of any conductive material. For example, it may be made of Kovar (iron-nickel-cobalt alloy). Further, the lid 12 may be a clad material constituted by covering Kovar or other base material with a film made of a metal offering high corrosion resistance such as nickel, platinum, silver, gold, palladium, etc., in order to prevent electrolytic corrosion.

The lid 12 is joined to the case 11 via the seal ring 18 after the electric storage element 13 has been placed in the solution chamber 11a, to seal the solution chamber 11a. The lid 12 may be joined to the seal ring 18 by means of seam welding, laser welding or other direct joining method, or indirect joining method using a conductive joining material in between.

The electric storage element 13 is accommodated in the solution chamber 11a and accumulates (stores) or releases (discharges) electric charges. As shown in FIG. 2, the electric storage element 13 has a positive electrode sheet 13a, negative electrode sheet 13b, and separation sheet 13c, and is constituted in such a way that the separation sheet 13c is sandwiched by the positive electrode sheet 13a and negative electrode sheet 13b.

The positive electrode sheet 13a is a sheet containing active material. The active material is a substance that adsorbs electrolyte ions (such as $BF_4$) onto its surface to form electric double layers, and may be active carbon or PAS (polyacenic semiconductor). The positive electrode sheet 13a may be made by rolling a mixture of the aforementioned active material, conductive auxiliary (such as Ketjen Black), and binder (such as PTFE (polytetrafluoroethylene)) into a sheet shape and then cutting the sheet.

The negative electrode sheet 13b is also a sheet containing active material, just like the positive electrode sheet 13a, and may be made by rolling a mixture of active material, conductive auxiliary, and binder into a sheet shape and then cutting the sheet. The negative electrode sheet 13b may be made of the same material used for the positive electrode sheet 13a, or a different material.

The separation sheet 13c is a sheet that electrically insulates electrodes. The separation sheet 13c may be a porous sheet made of glass fibers, cellulose fibers, plastic fibers, etc.

For the electrolyte accommodated in the solution chamber 11a with the electric storage element 13, its components can be selected as desired. For example, the selectable cations include the lithium ion, tetraethyl ammonium ion, triethyl methyl ammonium ion, 5-azoniaspiro[4.4]nonane ion, ethyl methyl imidazolium ion, etc.; the selectable anions include $BF_4^-$ (tetrafluoroborate ion), $PF_6^-$ (hexafluorophosphate ion), $(CF_3SO_2)_2N^-$ (TFSA ion), etc.; and the selectable solvents include propylene carbonate, ethylene carbonate, dimethyl carbonate, ethyl methyl carbonate, dimethyl carbonate, sulfolane, dimethyl sulfone, ethyl methyl sulfone, ethyl isopropyl sulfone, etc. To be specific, propylene carbonate solution of 5-azoniaspiro[4,4]nonane-$BF_4$ or ethyl methyl imidazolium-$BF_4$ may be used, among others.

The positive electrode wiring 14 electrically connects the positive electrode sheet 13a of the electric storage element 13 and the positive electrode terminal 16 via the positive electrode bonding layer 15. To be specific, the positive electrode wiring 14 can have a via hole part 14a provided in the via hole 11d, and a strip part 14b connected to the via hole part 14a and passing through the interior of the case 11 and connected to the positive electrode terminal 16. In cases such as when the via hole 11d is formed in a manner penetrating the case 11, the positive electrode wiring 14 may be constituted only by the via hole part 14a.

The positive electrode wiring 14 may be made of any conductive material. While the details are described later, the fact that the via hole part 14a is protected from electrolytic corrosion due to electrolyte contact allows for selection of the material for positive electrode wiring 14 from a wide range of materials regardless of their corrosion resistance, and, for example, the wiring may be made of tungsten having a high melting point.

Metal plating may be formed on the surface of the via hole part 14a. FIG. 3 shows a first plating layer M1 formed on the surface of the via hole part 14a and a second plating layer M2 (not illustrated in FIG. 2) formed on the first plating layer M1. For example, the first plating layer M1 may be made of nickel, while the second plating layer M2 may be made of gold. The number of plating layers and material for plating layer are not limited to what are shown here and may be changed as deemed appropriate.

The positive electrode bonding layer 15 bonds the positive electrode sheet 13a to the case 11, while electrically connecting the positive electrode sheet 13a and via hole part 14a. As shown in FIG. 2, the positive electrode bonding layer 15 is provided on the bottom face 11b and contacts the via hole part 14a via the concave part 11c. Given its role of bonding and electrically connecting the electric storage element 13, preferably the positive electrode bonding layer 15 is formed over the entire area of the electric storage element 13 (positive electrode sheet 13a). The positive electrode bonding layer 15 has a contact area that contacts the case 11 and a non-contact area that does not contact the case 11, both of which will be described later.

The positive electrode bonding layer 15 may be a hardened conductive bonding material applied on the bottom face 11b and the conductive bonding material may be a synthetic resin containing conductive grains. For the conductive grains, those having a high chemical stability are preferable, and graphite grains can be used, for example. For the synthetic resin, those having a low swelling property to the electrolyte, high heat resistance, and high chemical stability are preferable, and phenol resin can be used, for example.

The positive electrode terminal 16 is a terminal provided on the outside of the electrochemical device 100, contacting the positive electrode wiring 14 and connected to the positive electrode (positive electrode sheet 13a) of the electric storage element 13 via the positive electrode wiring 14 and positive electrode bonding layer 15. The positive electrode terminal 16 is used to connect the exterior of the electrochemical device 100, such as a mounting board, and the electrochemical device 100. The positive electrode terminal 16 may be made of any conductive material and its position and shape are not limited in any way.

The negative electrode bonding layer 17 fixes the negative electrode sheet 13b onto the lid 12, while electrically connecting the negative electrode sheet 13b and lid 12. The negative electrode bonding layer 17 is a hardened conductive bonding material and the conductive bonding material may be a synthetic resin containing conductive grains, as is the case with the positive electrode bonding layer 15. The negative electrode bonding layer 17 and positive electrode bonding layer 15 may be made of the same conductive bonding material or different conductive bonding materials.

The seal ring 18 connects the case 11 and lid 12 to seal the solution chamber 11a, while electrically connecting the lid 12 and negative electrode wiring 19. The seal ring 18 may be made of Kovar (iron-nickel-cobalt alloy) or other conductive material. Additionally, corrosion-resistant film (such as nickel film or gold film) may be formed on the surface of the seal ring 18. The seal ring 18 may be placed on the case 11 and lid 12 by means of brazing, etc., or placed on the case 11 by means of printing of conductive material, etc.

The negative electrode wiring 19 electrically connects the negative electrode sheet 13b of the electric storage element 13 and the negative electrode terminal 20 via the negative electrode bonding layer 17, lid 12, and seal ring 18. To be specific, the negative electrode wiring 19 may be formed along the outer periphery of the case 11 from the seal ring 18 and connected to the negative electrode terminal 20. The negative electrode wiring 19 is made of any conductive material and its position and shape are not limited in any way.

The negative electrode terminal 20 is a terminal provided on the outside of the electrochemical device 100, contacting the negative electrode wiring 19 and connected to the negative electrode (negative electrode sheet 13b) of the electric storage element 13 via the negative electrode wiring 19, seal ring 18, lid 12, and negative electrode bonding layer 17. The negative electrode terminal 20 is used to connect the exterior of the electrochemical device 100, such as a mounting board, and the electrochemical device 100, as is the case with the positive electrode terminal 16. The negative electrode terminal 20 may be made of any conductive material and its position and shape are not limited in any way.

[Groove]

Figure 4:
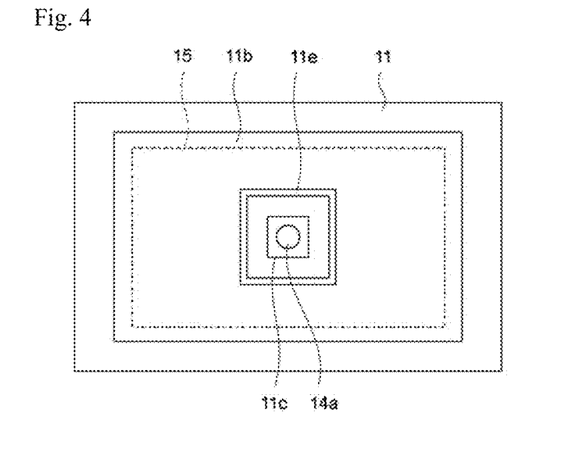
FIG. 4 is a plan view of the electrochemical device.

As mentioned above, the groove 11e is formed on the bottom face 11b. FIG. 4 is a schematic drawing showing the position of the groove 11e, showing the bottom face 11b as viewed from the solution chamber 11a side. As shown in this figure, the groove 11e is formed in a manner surrounding the via hole part 14a (the plating layers are not illustrated). The groove 11e need not have a rectangular shape over its path as shown in FIG. 4, but it can have a circular or polygonal shape, etc. Furthermore, double or multiple grooves 11e may be formed around the via hole part 14a. Additionally, while one via hole part 14a is formed in FIG. 4, multiple via hole parts 14a may be formed, in which case a groove 11e may be formed in a manner surrounding each via hole part 14a.

The positive electrode bonding layer 15 is formed on the case 11 (bottom face 11b) and thus a majority of the positive electrode bonding layer 15 contacts the case 11, but because of this groove 11e, an area is formed where the positive electrode bonding layer 15 does not contact the case 11. FIG. 3 shows a contact area 15a where the positive electrode bonding layer 15 contacts the case 11, and a non-contact area 15b where the positive electrode bonding layer 15 does not contact the case 11.

As mentioned above, the positive electrode bonding layer 15 may be a hardened conductive bonding material applied on the bottom face 11b, but when the width of the groove 11e is equal to or less than the specified width, the conductive bonding material does not enter the groove 11e, and the non-contact area 15b is formed. In other words, the non-contact area 15b can be formed by adjusting the width of the groove 11e as deemed appropriate according to, among others, the viscosity of the conductive bonding material that will constitute the positive electrode bonding layer 15. To be specific, preferably the groove 11e has a shape whose aspect ratio (ratio of the depth of the groove 11e to its width) is 1 or more.

This way, the groove 11e is sealed by the case 11 and non-contact area 15b, with gas sealed inside.

This way, the following effects are achieved. To be specific, when the electrolyte enters the interface between the positive electrode bonding layer 15 and bottom face 11b, it enters along the contact area 15a from the outer periphery side of the positive electrode bonding layer 15. Here, because the interface is broken in the non-contact area 15b and entry of electrolyte is suppressed by the three-layer interface comprising the positive electrode bonding layer 15, case 11, and gas, and therefore the electrolyte does not enter the inner periphery side from the non-contact area 15b. This is because the electrolyte tends to shrink due to surface tension. Accordingly, the electrolyte does not reach the via hole part 14a positioned on the inner periphery side of the non-contact area 15b and electrolytic corrosion of the via hole part 14a by the electrolyte is prevented as a result.

Figure 5:
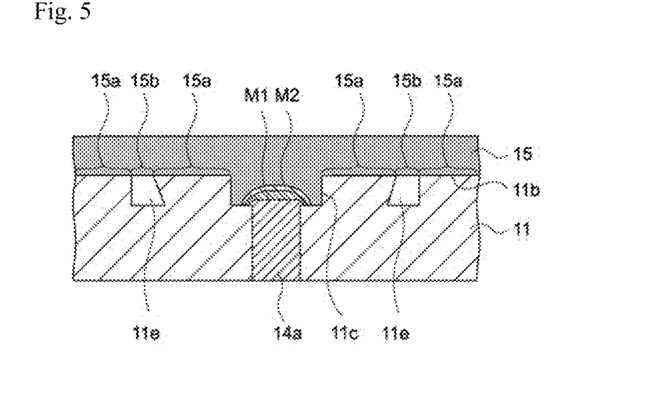
FIG. 5 is an enlarged section view of an electrochemical device according to an embodiment of the present invention.
Figure 6:
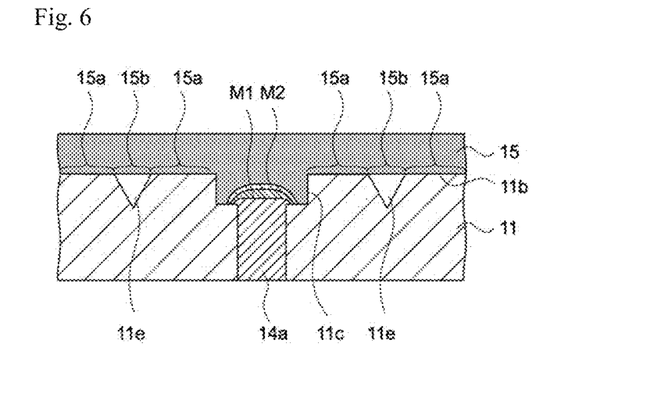
FIG. 6 is an enlarged section view of an electrochemical device according to an embodiment of the present invention.
Figure 7:
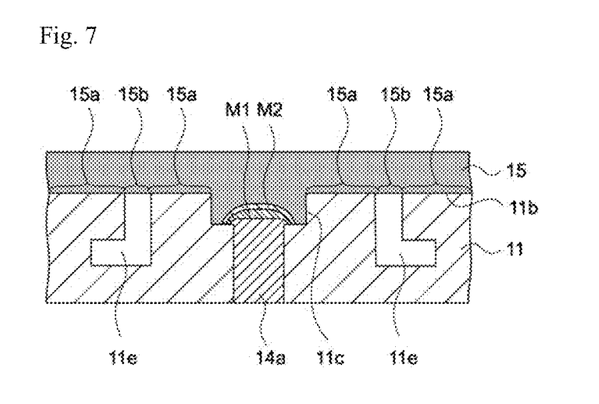
FIG. 7 is an enlarged section view of an electrochemical device according to an embodiment of the present invention.

The shape of the groove 11e is not limited to one having a rectangular cross-section as shown in FIG. 3. FIGS. 5 to 7 are schematic drawings showing grooves 11e of various shapes. The groove 11e shown in FIG. 5 has a cross-section shape where the side faces and bottom face of the groove 11e form sharp angles. The groove 11e shown in FIG. 6 has a V-shaped cross-section. The groove 11e shown in FIG. 7 has an L-shaped cross-section. Regardless of its shape, the groove 11e forms the non-contact area 15b on the positive electrode bonding layer 15, and the non-contact area 15b prevents entry of electrolyte.

(Second Embodiment)

The electrochemical device pertaining to the second embodiment of the present invention is explained. It should be noted that, since the only difference between this embodiment and first embodiment is the configuration of the groove, other parts are denoted by the same symbols used on the electrochemical device pertaining to the first embodiment, and are not explained.

Figure 8:
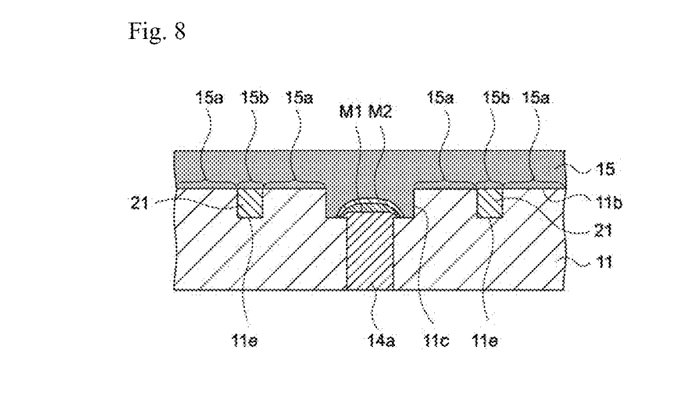
FIG. 8 is an enlarged section view of an electrochemical device according to an embodiment of the present invention.

FIG. 8 is an enlarged view of a part of the section drawing of the electrochemical device pertaining to this embodiment. As shown in this figure, a gas release part 21 is formed in the groove 11e of the electrochemical device. The gas release part 21 is electrically connected to the positive electrode bonding layer 15 and made of a material that releases gas as a result of electrolytic corrosion upon contacting the electrolyte when the electrochemical device is charging.

Figure 9:
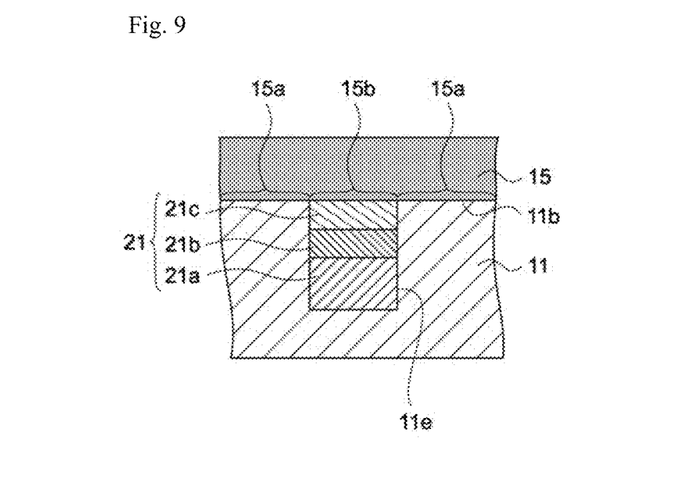
FIG. 9 is an enlarged section view of an electrochemical device according to an embodiment of the present invention.

To be specific, the gas release part 21 may have the same layer structure as that of the via hole part 14a. FIG. 9 is a schematic drawing showing the configuration of the gas release part 21, being a partial enlarged view of FIG. 8. As shown in this figure, the gas release part 21 may comprise a first metal layer 21a, second metal layer 21b and third metal layer 21c stacked on top of each other. The first metal layer 21a may be made of the same material that constitutes the via hole part 14a (such as tungsten); the second metal layer 21b may be made of the same material that constitutes the first plating layer M1 (such as nickel); and the third metal layer 21c may be made of the same material that constitutes the second plating layer M2 (such as gold).

Even when the gas release part 21 is formed in the groove 11e, the non-contact area 15b where the positive electrode bonding layer 15 does not contact the case 11 is still formed on the positive electrode bonding layer 15. The electrolyte, if it enters the interface between the positive electrode bonding layer 15 and bottom face 11b, will enter along the contact area 15a from the outer periphery side of the positive electrode bonding layer 15. Here, as the electrolyte contacts the gas release part 21, gas is released from the gas release part 21 and the pressure of this gas causes the electrolyte to be pushed back. Accordingly, the electrolyte does not reach the via hole part 14a positioned on the inner periphery side of the non-contact area 15b, and electrolytic corrosion of the via hole part 14a by the electrolyte is prevented as a result.

Figure 10:
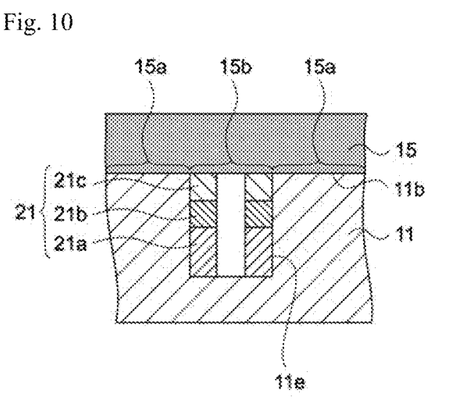
FIG. 10 is an enlarged section view of an electrochemical device according to an embodiment of the present invention.
Figure 11:
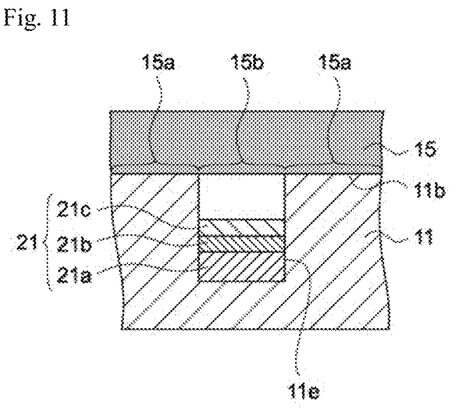
FIG. 11 is an enlarged section view of an electrochemical device according to an embodiment of the present invention.

The gas release part 21 is not limited to one formed to occupy the entire groove 11e as shown in FIG. 9. FIGS. 10 and 11 are schematic drawings showing various patterns of the gas release part 21. As shown in FIG. 10, the gas release part 21 may be formed as separate parts at multiple locations on a part of the bottom face of the groove 11e. Also, as shown in FIG. 11, the gas release part 21 may be partially formed on the bottom face side of the groove 11e so that, while electrically connected to the positive electrode bonding layer 15, it is partially separated from the positive electrode bonding layer 15. Gas may be sealed in a void in the groove 11e where the gas release part 21 is not provided. Additionally, the groove 11e is not limited to one having a rectangular cross-section and can have a cross-section of any of the various shapes shown in the first embodiment.

EXAMPLES

Examples of the aforementioned embodiments are explained. Electrochemical devices were produced as described below, and various measurements were made.

Active carbon powder (active material) of 1000 to 2000 $m^2/g$ in specific surface area, 15 percent by weight of Ketjen Black (conductive auxiliary), and 6 percent by weight of PTFE powder (binder) were mixed, and the mixture was rolled to produce an electrode sheet of 0.18 to 0.22 mm in thickness. This electrode sheet was cut to 1-mm squares to produce a positive electrode sheet and negative electrode sheet.

Conductive bonding material (phenol resin containing graphite grains of 10 μm in average grain size) was applied on the bottom face of a case to approx. 15 μm. Here, cases having the various configurations described below were prepared.

Example 1

A via hole is formed in the bottom face of the case and a groove is formed around the via hole. The groove has an inverted-triangle cross-section (refer to FIG. 6) of 100 μm in width and 100 μm in depth. When conductive bonding material was applied on the bottom face of the case, gas was sealed in the deepest part of the groove.

Example 2

A via hole is formed in the bottom face of the case and a groove is formed around the via hole. The groove has a rectangular cross-section of 200 μm in width and 100 μm in depth, and a gas release part comprising tungsten, nickel, and gold layers stacked on top of each other in this order is formed at the bottom face of the groove (refer to FIG. 9). When conductive bonding material was applied on the bottom face of the case, the conductive bonding material contacted the gas release part and the gas release part electrically connected to the via hole via the conductive bonding material.

Comparative Example 1

A via hole is formed in the bottom face of the case and no groove is formed. When conductive bonding material was applied on the bottom face of the case, the entire area of conductive bonding material contacted the bottom face.

In each of the above examples, the positive electrode sheet was attached on the conductive bonding material. The conductive bonding material was applied on the lid and the negative electrode sheet was attached. The lid is a clad material of 0.1 mm in overall thickness, constituted by Kovar (Fe—Ni—Co) alloy with nickel rolled and attached on both sides of the alloy.

A separate sheet made of glass fibers was positioned on the positive electrode sheet attached on the case, and electrolyte was injected into the positive electrode sheet and negative electrode sheet. The lid was overlaid on the case and welded to seal the case and lid. This way, the electrochemical devices pertaining to Example 1, Example 2, and Comparative Example 1 were obtained.

First, the electrochemical devices pertaining to Example 1, Example 2, and Comparative Example 1 were measured for capacity. Then, the electrochemical devices were given a high-temperature load test (continuous charging at 3.3 V, 70° C.) to deteriorate in an accelerated manner, and measured for capacity again after 1,000 hours. Devices whose capacity dropped to less than 60% of the capacity before the high-temperature load test were considered faulty.

The failure rate was 0% in Example 1, 0% in Example 2, and 5% in Comparative Example 1. The electrochemical devices pertaining to Examples 1 and 2 did not fail, while some of the electrochemical devices pertaining to Comparative Example 1 failed. When the cross-sections of electrochemical devices were observed, the electrochemical devices pertaining to Examples 1 and 2 did not present abnormality in their via hole parts, but on the electrochemical device pertaining to Comparative Example 1, corrosion was found in their via hole parts.

The above results show that the electromechanical devices pertaining to the first and second embodiments above prevent corrosion in their via hole parts and offer improved durability compared to the electrochemical device pertaining to the comparative example.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, an article "a" or "an" may refer to a species or a genus including multiple species, and "the invention" or "the present invention" may refer to at least one of the embodiments or aspects explicitly, necessarily, or inherently disclosed herein. In this disclosure, any defined meanings do not necessarily exclude ordinary and customary meanings in some embodiments.

The present application claims priority to Japanese Patent Application No. 2013-125145, filed Jun. 14, 2013, the disclosure of which is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

I claim:

1. An electrochemical device comprising:

a lid;

a case having a via hole and forming a solution chamber between the case and the lid;

an electric storage element accommodated in the solution chamber;

an electrolyte accommodated in the solution chamber;

a wiring having a via hole part which is provided in the via hole and connects an interior and exterior of the solution chamber; and a conductive bonding material layer fixing the electric storage element onto the case and electrically connecting the electric storage element and the via hole part, where the conductive bonding material layer has a contact area that contacts the case and a non-contact area that does not contact the case, wherein the contact area contacts the case in a via hole-surrounding area defined around the via hole, and the non-contact area is formed within a parameter of the contact area in a manner surrounding the via hole-surrounding area and away from the via hole as viewed from above, wherein the conductive bonding material layer extends over the contact area and the non-contact area.

2. An electrochemical device according to claim 1, wherein the case has a groove formed in a manner surrounding the via hole as viewed from above, and the non-contact area is formed by the groove.

3. An electrochemical device according to claim 2, wherein the groove is empty, and gas is sealed in the groove by the case and non-contact area.

4. An electrochemical device according to claim 2, wherein the groove accommodates a gas release part electrically connected to the conductive bonding material layer, and made of a material that releases gas as a result of electrolytic corrosion upon contacting the electrolyte when the electrochemical device is charging.

5. An electrochemical device according to claim 4, wherein the via hole is metal-plated, and the gas release part has a same layer structure as that of the via hole part.

6. An electrochemical device according to claim 2, wherein the groove has a rectangular cross-section.

7. An electrochemical device according to claim 2, wherein the groove has a V-shaped cross-section.

8. An electrochemical device according to claim 2, wherein the groove has a side face and a bottom face, and the side face forms a sharp angle with the bottom face.

9. An electrochemical device according to claim 2, wherein the groove has an L-shaped cross-section.

* * * * *

UNITED STATES PATENT AND TRADEMARK OFFICE
CERTIFICATE OF CORRECTION

| | | |
|---|---|---|
| PATENT NO. | : 9,305,717 B2 | Page 1 of 1 |
| APPLICATION NO. | : 14/196822 | |
| DATED | : April 5, 2016 | |
| INVENTOR(S) | : Naoto Hagiwara | |

It is certified that error appears in the above-identified patent and that said Letters Patent is hereby corrected as shown below:

On the Title Page, item (54) and in the Specification, Column 1, line 3 in the Title, please delete "ELECTROYE" and insert therefor --ELECTROLYTE--.

Signed and Sealed this
Fourteenth Day of June, 2016

Michelle K. Lee
*Director of the United States Patent and Trademark Office*